United States Patent [19]

Fasano

[11] 3,988,945

[45] Nov. 2, 1976

[54] CONTROL LEVER SYSTEM, PARTICULARLY FOR VEHICLE BRAKES

[75] Inventor: Osvaldo Fasano, Villarbasse Turin, Italy

[73] Assignee: Start S.p.A. Studi Apparecchiature e Ricerche Tecniche, Turin, Italy

[22] Filed: Apr. 11, 1975

[21] Appl. No.: 567,336

[30] Foreign Application Priority Data

Apr. 17, 1974 Italy .................................. 68224/74

[52] U.S. Cl. .................................. 74/512; 74/516; 74/518; 74/560
[51] Int. Cl.² ........................................... G05G 1/14
[58] Field of Search .............. 74/516, 517, 518, 512

[56] References Cited
UNITED STATES PATENTS

| | | | |
|---|---|---|---|
| 1,911,223 | 5/1933 | D'Aleo.................................. | 74/516 |
| 2,884,803 | 5/1959 | Willis.................................. | 74/518 X |
| 3,646,830 | 3/1972 | Shrock.................................. | 74/516 |
| 3,798,995 | 3/1974 | Schroter.......................... | 74/518 X |

FOREIGN PATENTS OR APPLICATIONS

| | | | |
|---|---|---|---|
| 693,623 | 11/1930 | France.................................. | 74/516 |
| 939,808 | 11/1948 | France.................................. | 74/516 |
| 402,034 | 2/1932 | United Kingdom.................... | 74/516 |

*Primary Examiner*—Samuel Scott
*Assistant Examiner*—F. D. Shoemaker
*Attorney, Agent, or Firm*—Sughrue, Rothwell, Mion, Zinn & Macpeak

[57] ABSTRACT

A control lever mechanism which operates to provide a different mechanical advantage at different points in the range of movement of a main operating control member and in dependence on the force applied to, and the force of resistance to the movement of, the main control member is disclosed. The main control lever is pivoted to a fixed fulcrum and linked to a force transmission member by a second pivot forming a fulcrum which is movable along an arcuate path closer to or further away from the fixed fulcrum. When both the fixed fulcrum and the movable fulcrum lie on the same side of the line of action of the force transmission member a component of the applied force tends to move the movable fulcrum towards the fixed fulcrum to increase the mechanical advantage of the control lever.

5 Claims, 10 Drawing Figures

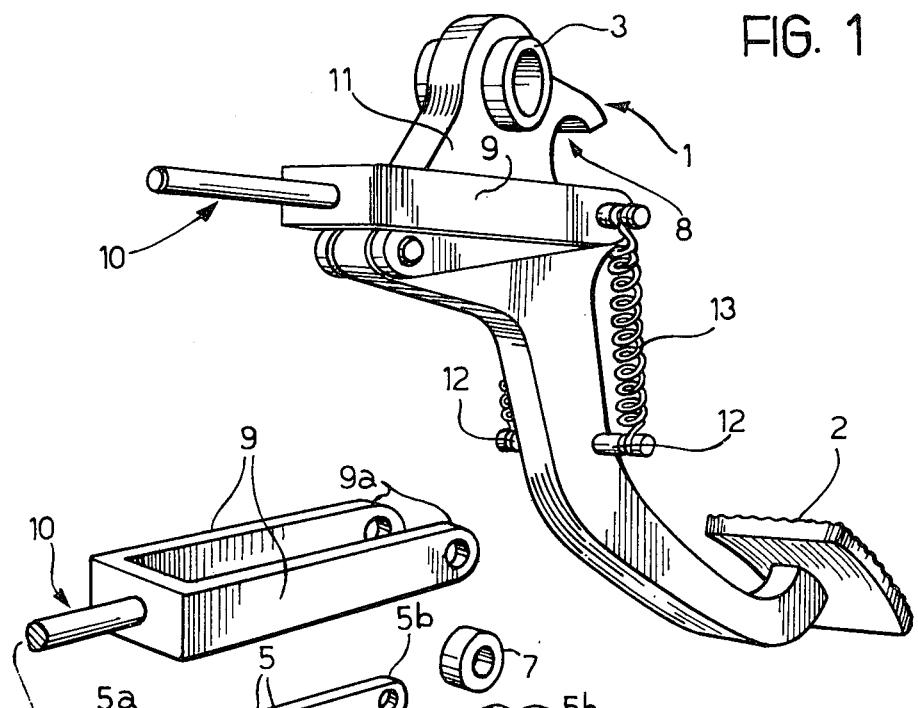
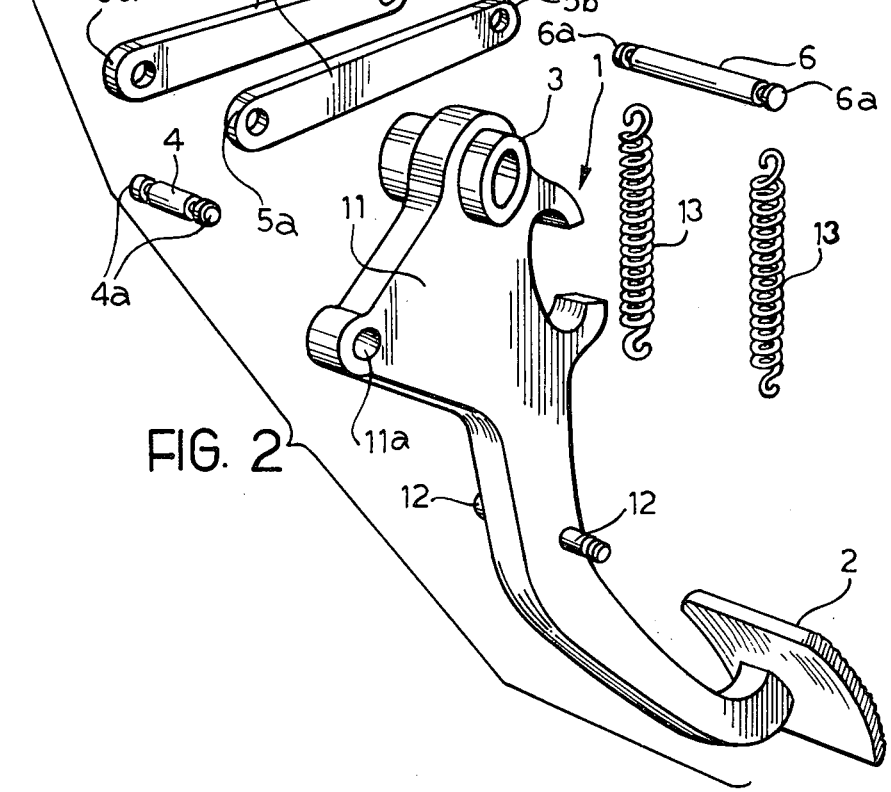

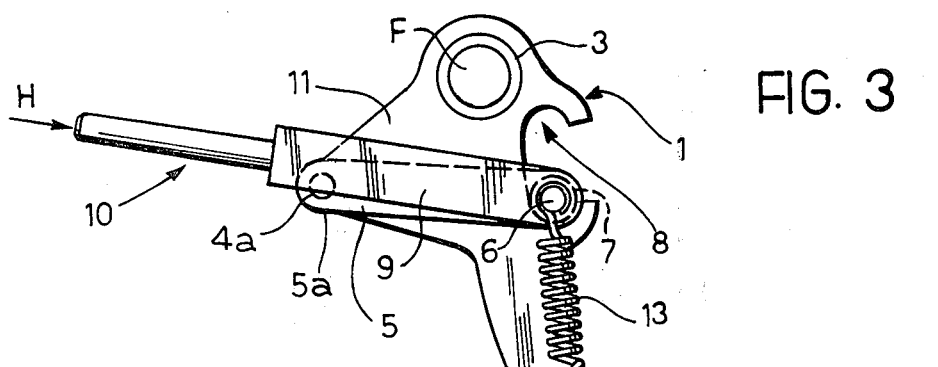
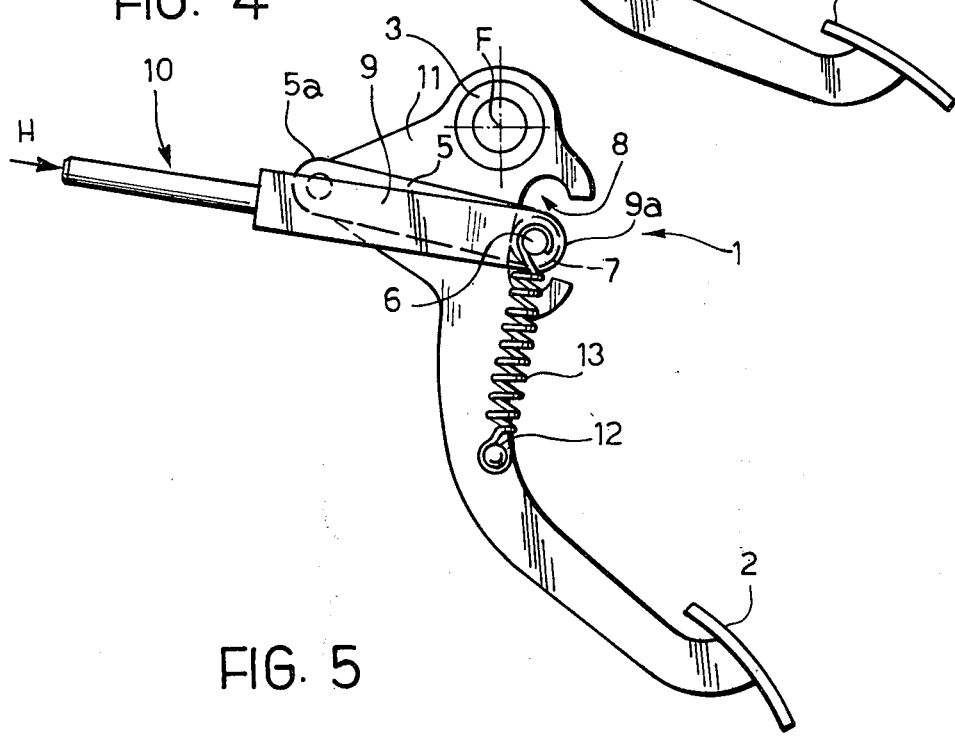
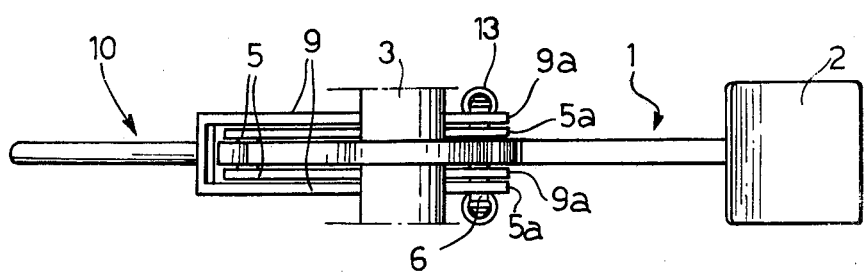

CONTROL LEVER SYSTEM, PARTICULARLY FOR VEHICLE BRAKES

The present invention relates to control lever mechanisms, and particularly to a mechanism suitable for control of a dual circuit hydraulic brake system for motor vehicles. Known control lever mechanisms of this type comprise a control lever carried at one end on a fixed fulcrum about which it is turnable by the application of a force to the free end thereof, and a force transmission member, free to turn about a second fulcrum or pivot by means of which it is attached to the control lever.

The present invention seeks to provide a lever operated control mechanism of the above mentioned type, which is particularly suitable for a dual circuit braking system, and which is such that efficient braking action can be obtained even when the conditions under which braking has to take place are very different from normal, such as occurs, for example, in the case of failure of one of the two circuits of a dual circuit braking system having two independent circuits.

According to the present invention, there is provided a control lever mechanism of the type comprising a control lever pivotable about a first fulcrum upon the application of a force to a free end thereof, and a force transmission member pivotally connected to the control lever by a coupling forming a second fulcrum, characterised in that the second fulcrum is movable with respect to the first fulcrum and there are provided guide means for guiding the movement of the second fulcrum along an arcuate path with respect to the control lever, resilient biasing means for urging the second fulcrum along the arcuate path away from the first fulcrum and means for limiting the movement of the said second fulcrum along the said arcuate path, the said guide means being so positioned that the centre of curvature of the arcuate path defined thereby lies on one side of the line of action of the force transmission member at one end of the range of movement of the control lever about the first fulcrum, and on the other side of the line of action of the force transmission member at the other end of the range of movement of the control lever about the first fulcrum, the arrangement being such that the second fulcrum is urged towards the first fulcrum, against the action of the resilient biasing means, at least as the control lever approaches one end of its range of movement about the first fulcrum.

In such a control lever mechanism the second fulcrum is biased by the resilient biasing means away from the first or fixed fulcrum of the control lever when the control lever is at rest. When an operating force is applied to the control lever, however, so that the lever is turned about the first or fixed fulcrum, the second or movable fulcrum is moved progressively towards the first fulcrum against the action of the resilient biasing means. The amount of movement of the movable fulcrum will depend on the resistance to movement offered by the force transmission member, the greater is this resistance the further the movable fulcrum moves for a given movement of the control lever. As the control lever is moved through its full range of movement the movable fulcrum thus gradually approaches the fixed fulcrum, up to a limit imposed by the said limiting means thereby progressively and gradually increasing the mechanical advantage of the operating force applied to the free end of the control lever by reducing the "transmission ratio" of the mechanism and also the ratio of the moment of the force of resistance applied to the lever by the force transmission member to the moment of the force applied to the free end of the control lever. Consequently, when the lever system is used in a braking system, an initial small movement of the lever (formed for example as a brake pedal) causes a relatively large displacememt of the member controlled thereby as the transmission ratio is at its highest. This makes possible a rapid take up of any slack movement in the controlled member. As the brakes are progressively applied, however, increasing the resistance applied by the force transmission member, a small movement of the controlled member is needed, with a strong force acting upon it. The control lever mechanism of the invention fulfils these requirements by the effective change in the transmission ratio caused by movement of the movable fulcrum.

The mechanism according to the invention is particularly suitable for use in hydraulic braking systems of the dual circuit type. In these systems, in the event of failure of one of the two circuits, the slack in the stroke of the force transmission member increases, and in such cases, during the whole of this slack part of the stroke, the mechanism of the invention operates at its highest transmission ratio, thereby requiring only a small pedal movement to effect a large displacement of the member controlled thereby. In this way an increase in the slack movement of the pedal upon failure of one of the two circuits is limited so that good braking can still be achieved in spite of the changed conditions of operation.

Preferably the centre of curvature of the arcuate path of the movable fulcrum is closely adjacent the line of action of the force transmission member when the control lever is at rest, that is when no force is applied to the free end thereof, but on the side of the said line of action remote from the fixed fulcrum of the control line. This allows movement of the movable fulcrum towards the fixed fulcrum after only a small movement of the control lever, should the resistance applied to the force transmission member be high enough to cause this movement. Movement of the movable fulcrum towards the fixed fulcrum occurs in all positions of the control lever in which the centre of curvature of the arcuate path of the movable fulcrum is located on the same side of the line of action of the force transmission member as the fixed fulcrum of the control lever. The advantage of positioning the centre of the arcuate path of the movable fulcrum on the opposite side of the line of action of the force transmission member from the fixed fulcrum is that this maintains the transmission ratio of the mechanism at its highest value over a certain small displacement of the control lever about the fixed fulcrum even when there is a resistance to displacement, rather than permitting the transmission ratio to commence its progressive reduction immediately when the control lever is displaced.

A further advantage of this arrangement of the mechanism lies in the fact that even in the case of failure of the resilient biasing means the mechanism functions correctly still providing a progressive reduction of the transmission ratio upon increase of the movement of the control lever. The reduction in the transmission ratio in this case would be slightly in advance of what it would be if the resilient biasing means were in operation: in fact the centre of curvature of the arcuate path of the movable fulcrum tends to remain aligned with the line of action of the force transmission member as the control lever is moved from one end of its range of movement to the other. Since the position of the centre of curvature of the arcuate path of the movable fulcrum is, in these conditions (that is in the absence of the resilient biasing means) determined by the geometrical conditions, the transmission ratio of the mechanism will be independent of the value of the resistive force.

Various embodiments of the invention will now be more particularly described, by way of example, with reference to the accompanying drawings, in which:

FIG. 1 is a perspective view of a first embodiment of the invention;

FIG. 2 is an exploded view, of the embodiment of FIG. 1;

FIG. 3 is a side view of the embodiment of FIG. 1, in a first operational position;

FIG. 4 is a side view similar to that of FIG. 3, of the embodiment of FIG. 1, in a second operational position;

FIG. 5 is a top plan view of the embodiment shown in FIG. 3;

Figure 6:
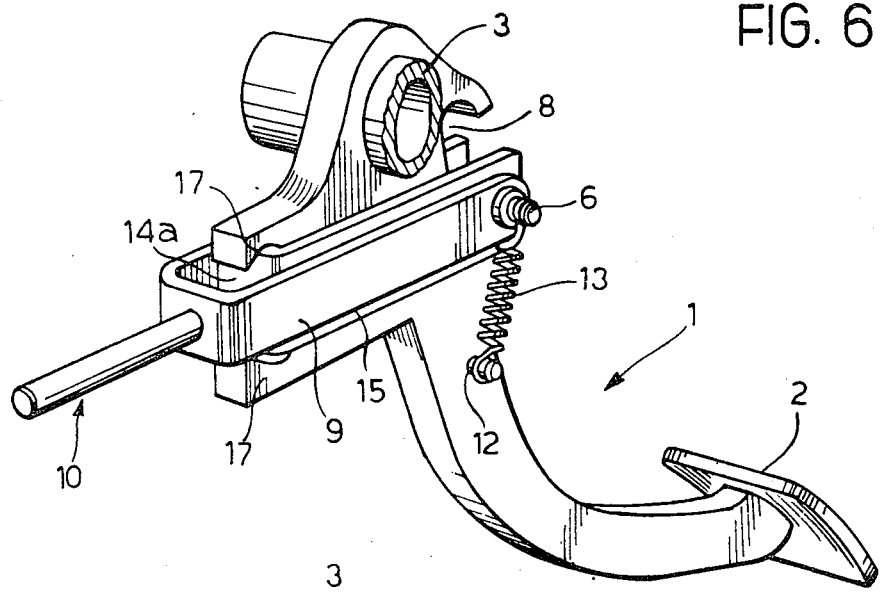
FIG. 6 is a perspective view, similar to FIG. 1, of a second embodiment of the invention.
Figure 7:
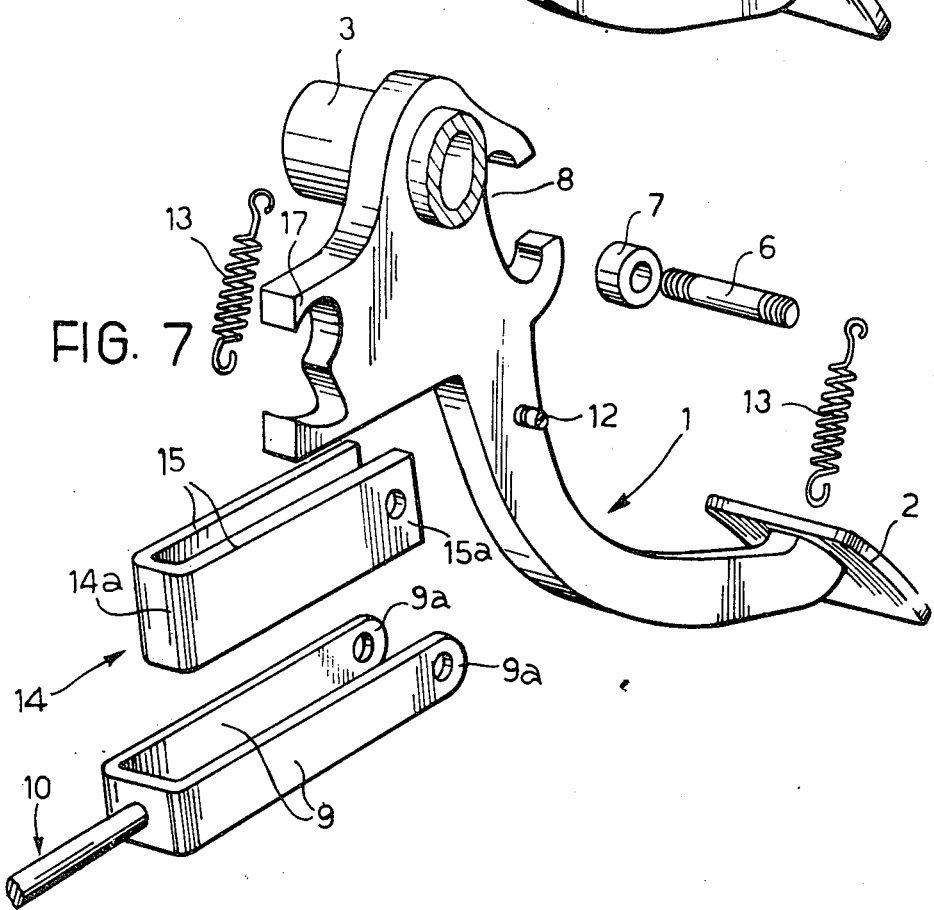
FIG. 7 is an exploded view of the embodiment of FIG. 6.
Figure 8:
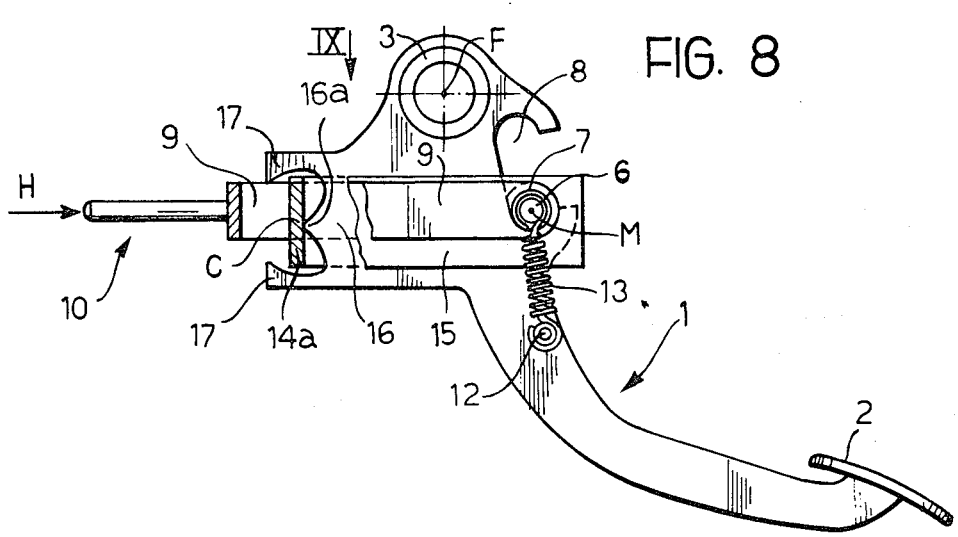
FIG. 8 is a partially sectioned side view of the embodiment of FIG. 6.
Figure 9:
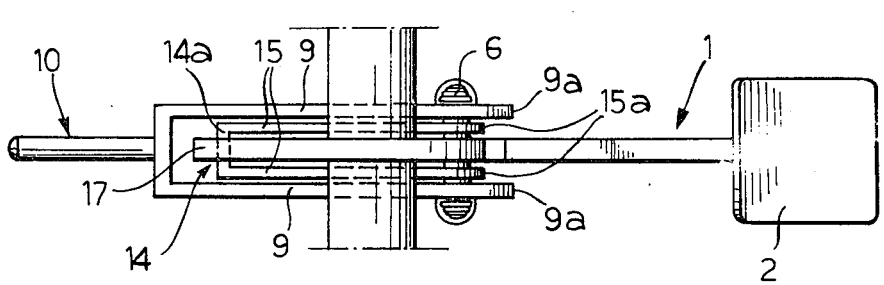
FIG. 9 is a plan view of the embodiment of FIG. 8 as viewed in the direction of the arrow IX.

Referring now to the drawings, and particularly to FIGS. 1 to 5, there is shown a control lever generally indicated 1, which is provided at one end with a pedal 2 to which is applied a control force by pressing with the foot. At the other end of the lever 1 is a bush 3 through which passes a pivot pin, not illustrated, which serves as the fixed fulcrum of the lever 1. The lever 1 also has a projection 11 lying in the plane of movement of the lever 1, that is the plane perpendicular to the axis of the bush 3; the projection 11 has a hole 11a through which passes a pin 4. Upon each end 4a of the pin 4 there engages one end 5a of a respective intermediate link 5. The two intermediate links 5 lie on opposite sides of the control lever 1, and extend parallel to each other. At their other ends 5b, the intermediate links 5 are connected to another pin 6 which is located within an elongate recess 8 in the lever 1 along which recess 8 the pin is movable from one end to the other as will be described below. Around the pin 6 and between the two links 5 is a ring 7 of elastomeric material which serves as a resilient buffer to absorb shocks as the pin 6 moves against the end walls of the recess 8 at each end of its travel. The path followed by the pin 6 within the recess 8 is in the form of a circumferential arc the centre of which lies at the axis C of the pin 4 since its movement is constrained by the pivoted links 5. Pivotal movement of the lever 1 and the force exerted thereupon is transmitted to a rod 10 along which the resistance to the movement of the lever 1 is applied as a compressive force H. The rod 10 has a fork at one end comprising two parallel prongs 9 the free ends 9a of which are pivotally connected to the pin 6, which thus forms a fulcrum about which the transmission rod 10 and the control lever 1 are relatively turnable, which fulcrum is displaceable with respect to the main fulcrum F formed by the pivot pin (not shown) which passes through the bush 3.

To each end 6a of the pin 6 there is connected one end of a respective tension spring 13, the other ends of which are connected to a transverse pin 12 fixed to the control lever 1. The tension in the springs 13 tends to move the pin 6 away from the fixed fulcrum F of the control lever 1.

When there is no force applied to the pedal 2 the lever 1 adopts the position shown in FIG. 3, in which the pin 4, is to one side of the transmission rod 10, that is the side opposite that on which lies the main fulcrum of the lever 1. Thus, when a force is applied to the pedal 2 tending to turn the lever 1, this force is transmitted to the transmission rod 10 by the links 5 which are slightly inclined to the line of action of the resistance H experienced by the rod 10 so that there is a component of the force applied by the links transverse the rod 10 and reinforcing the tension applied by the spring 13. The movable fulcrum M thus occupies its furthest position from the fixed fulcrum F. Upon further turning of the lever 1 the pin 4 is carried across the centreline of the rod 10 to the position shown, for example, in FIG. 4. The force applied to the rod 10 by the links 5 now has a component parallel to the rod 10 itself and a component transverse the rod 10 and opposing the tension applied by the springs 13. Depending on the magnitude of the force applied to the pedal 2 the transverse component of the force applied by the links 5 to the rod 10 will be greater or less than the force applied by the springs 13, and when it is greater the pin 6 will move along the recess 8 until a position of balance is achieved between the force applied by the spring 13 and the transverse component of the force applied by the links 5. Upon further turning of the control lever 1, therefore, the movable fulcrum M progressively and gradually approaches the fixed fulcrum F.

Corresponding with this approach there is a progressive reduction of the ratio between the moment about the fixed fulcrum F of the force of resistance H and the force applied to the pedal 2. The approach of the movable fulcrum M formed by the pin 6 continues upon further turning of the lever 1 until the pin 6 abuts the end of the recess 8 which defines the closest point of approach of the movable fulcrum to the fixed fulcrum. This position is reached more rapidly, that is for a smaller turning of the lever 1 from its rest position shown in FIG. 3, according as the resistant force H is greater. Once the pin 6 reaches the end position in the recess 8 it remains in this position until the lever 1 turns back towards its initial position upon release of the force on the pedal 2 causing the turning of the lever 1.

In the embodiment illustrated in FIGS. 6 to 9, the elements in common with those of the embodiment illustrated in FIGS. 1 to 5 are indicated with the same reference numbers. In this embodiment the links 5 are replaced by a link member, generally indicated 14, formed by bending a flat strip of material into an elongated U-shape to have two parallel arms 15 joined by a base 14a. The free ends 15a of the arms 15 have aligned holes through which passes the pin 6 constituting the movable fulcrum M of the mechanism. The inner surface of the base 14a of the U-shape link member 14 rests upon a point 16a of a projecting part 16 of the control lever 1. Engagement of the base 14a with the point 16a is ensured by two arms 17 which extend on either side thereof and act to locate the base 14a of the link member 14 in engagement with the point 16a. The point of engagement between the base 14a of the link 14 and the pointed end 16a of the projection 16 is indicated C. This point represents the centre of turning movement of the link 14 and thus the centre of the arcuate path described by the movable fulcrum M formed by the pin 6.

Figure 10:
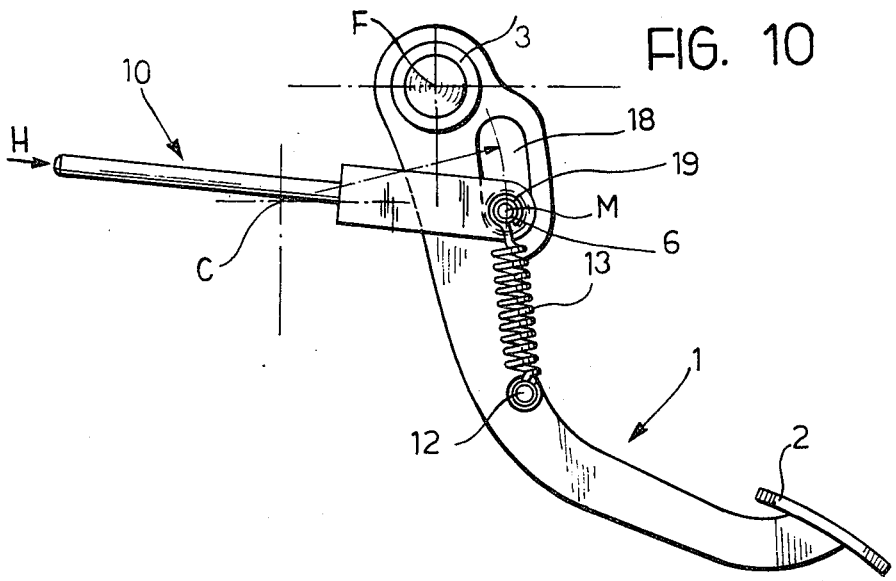
FIG. 10 is a side view of a third embodiment of the invention.

In the embodiment illustrated in FIG. 10 the movement of the movable fulcrum M formed by the pin 6 is guided without the help of intermediate links. For this purpose the pin 6 is guided in a slot 18 in the control lever 1, the slot 18 having an arcuate form the centre of which is the point C. The pin 6 carries a sleeve 19 which acts as a roller and is housed substantially without play within the slot 18 so as to be guided thereby. The force applied by the lever 1 to the transmission rod 10 will thus have a component parallel to the rod 10 and a component perpendicular to the rod 10. The direction of the perpendicular component, towards or away from the fixed fulcrum F will depend on the relative inclination of the walls of the slot 18 which in turn will depend on the angular position of the lever 1. As the lever is turned by the application of a force to the pedal 2, the pin 6 will gradually move along the slot 18 towards the fixed fulcrum F.

I claim:

1. In a control lever mechanism of the type comprising:
   a control lever having a fixed end carried on a fixed fulcrum and a free end, said lever being turnable about said fixed fulcrum upon the application of a force to said free end thereof,
   a force transmission member linking said control lever with an element to be controlled, and
   pivotal connection means connecting said force transmission member to said control lever, said pivotal connection means forming a second fulcrum on said control lever,
   the improvement wherein,
   said second fulcrum is displaceable with respect to said control lever, there are provided:
      guide means for guiding the displacement of said second fulcrum along an arcuate path which brings it closer to or further away from said first fulcrum,
      resilient biasing means urging said second fulcrum along said arcuate path away from said first fulcrum, and
      limit stop means for limiting the movement of said second fulcrum along said arcuate path, and
   said guide means are positioned such that the centre of curvature of said arcuate path defined thereby lies on one side of the line of action of said force transmission member when said control lever is at one end of its range of pivotal movement about said first fulcrum, and on the other side of said line of action when said control lever is at the other end of its said range of movement, whereby the force exerted on said second fulcrum by said force transmission member in reaction to a force applied in one direction to said free end of said control lever urges said second fulcrum towards one end of said arcuate path when said control lever is at said one end of said range of movement and towards the other end of said arcuate path when said control lever is at said other end of said range of movement.

2. The control lever mechanism of claim 1, wherein said one end of said range of movement of said control lever about said first fulcrum is the position to which said control lever is moved upon application of the maximum force to said free end thereof, and wherein at said other end of said range of movement of said control lever said line of action of said force transmission member lies between said first fulcrum and said centre of curvature of said arcuate path of the second fulcrum defined by said guide means, said centre of curvature of said arcuate path being closely adjacent said line of action of said force transmission member.

3. The control lever mechanism of claim 1, wherein said guide means comprise:
   two parallel intermediate link members one on each side of the control lever,
   means pivotally connecting each said link member at one end thereof to said control lever,
   a pin linking the other end of said intermediate link member and constituting said movable fulcrum, and
   means connecting said pin to said force transmission member, said means including,
   a forked end on said force transmission member, said forked end comprising two prongs lying on opposite sides of said control lever and being pivoted at their free ends to said pin connecting said other ends of said intermediate links.

4. The control lever mechanism of claim 1 wherein:
   said guide means comprise an intermediate U-shape link member having two parallel arms joined by a base,
   a pointed end of a projecting part of said control lever,
   said base engaging said pointed end with said two arms lying one on either side of said control lever,
   a pin linking the free ends of said arms of said U-shape link member and constituting said movable fulcrum, and
   means connecting said pin to said force transmitting member, said means including,
   a forked end on said force transmission member, said forked end comprising two prongs lying on opposite sides of said control lever and being pivoted at their free ends to said pin connecting said free ends of said parallel arms of said U-shape intermediate link member.

5. The control lever mechanism of claim 1, wherein said guide means comprise an arcuate slot in said control lever,
   a pin which constitutes said movable fulcrum extending through said slot, and
   means connecting one end of said force transmission member to said pin, said connecting means including,
   a forked end on said force transmission member, said forked end comprising two prongs lying on opposite sides of said control lever and being pivoted at their free ends to said pin engaged in the said slot in said control lever.

* * * * *